(12) United States Patent
Katagiri et al.

(10) Patent No.: US 8,528,374 B2
(45) Date of Patent: Sep. 10, 2013

(54) PORTABLE DEVICE INCLUDING MECHANICAL KEY

(75) Inventors: Toshiharu Katagiri, Aichi (JP); Jun Yamaguchi, Aichi (JP); Takao Ogimoto, Aichi (JP); Takumi Tamezane, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 1341 days.

(21) Appl. No.: 11/605,189

(22) Filed: Nov. 28, 2006

(65) Prior Publication Data
US 2007/0137271 A1   Jun. 21, 2007

(30) Foreign Application Priority Data

Nov. 29, 2005 (JP) ................................ 2005-344670
Nov. 29, 2005 (JP) ................................ 2005-344671

(51) Int. Cl.
*A45C 11/32* (2006.01)
*E05B 19/04* (2006.01)

(52) U.S. Cl.
USPC ................. 70/456 R; 70/408; 70/414; 70/459

(58) Field of Classification Search
USPC ............... 70/456 R, 393, 459, 395, 397, 398,
70/408, 414, 429, 430, 456 B, 457, 458;
D3/207–212; 206/37.1–37.8; 340/5.62
See application file for complete search history.

(56) References Cited

U.S. PATENT DOCUMENTS

| | | | | |
|---|---|---|---|---|
| 653,155 | A * | 7/1900 | Tilden, M. ......................... | 5/256 |
| 1,898,202 | A * | 2/1933 | Murray ....................... | 70/456 R |
| 2,720,777 | A * | 10/1955 | Kocsi .......................... | 70/456 R |
| 2,822,684 | A * | 2/1958 | Ray .............................. | 70/456 R |
| 3,122,829 | A | 3/1964 | Schaad et al. | |
| 4,888,970 | A | 12/1989 | Kinzler et al. | |
| 5,425,531 | A * | 6/1995 | Perrault ........................ | 267/180 |
| 5,878,998 | A * | 3/1999 | Hsieh .......................... | 267/166.1 |
| 6,007,941 | A * | 12/1999 | Hermann et al. .............. | 429/99 |
| 6,474,123 | B1 * | 11/2002 | Kito et al. .................... | 70/456 R |
| 6,691,539 | B2 * | 2/2004 | Jacob et al. ..................... | 70/408 |
| 6,705,141 | B1 * | 3/2004 | Jacob et al. .................... | 70/408 |
| 7,055,352 | B2 * | 6/2006 | Meyerson et al. .......... | 70/456 R |
| 7,090,521 | B2 * | 8/2006 | Nishio et al. .................. | 439/248 |
| 7,098,791 | B2 * | 8/2006 | Okada ........................ | 340/568.1 |

(Continued)

FOREIGN PATENT DOCUMENTS

| | | |
|---|---|---|
| EP | 0 267 429 A1 | 5/1988 |
| FR | 2 855 544 | 12/2004 |

(Continued)

*Primary Examiner* — Carlos Lugo
*Assistant Examiner* — Alyson M Merlino
(74) *Attorney, Agent, or Firm* — Patterson Thuente Pedersen, P.A.

(57) ABSTRACT

A portable device having compact size while accommodating a mechanical key therein. The mechanical key has an opening and an internal space, which are in communication with each other. An engagement member, arranged in the internal space, is movable between a first position where it partially projects from the opening and a second position where it is accommodated in the internal space. A resilient member, which urges the engagement member from the second position toward the first position is arranged in the internal space, includes a fixing portion fixed to the mechanical key in the internal space. The portable device further includes a case having a key accommodation portion for removably accommodating the mechanical key. The key accommodation portion includes an engaged portion that is engaged with the engagement member when the mechanical key is accommodated in the key accommodation portion.

11 Claims, 10 Drawing Sheets

(56) References Cited

U.S. PATENT DOCUMENTS

| | | |
|---|---|---|
| 7,309,357 B2 * | 12/2007 | Kim .......................... 623/17.13 |
| 7,690,233 B2 * | 4/2010 | Katagiri et al. ............. 70/456 R |
| 7,929,859 B2 * | 4/2011 | Saiki ............................ 396/543 |
| 2003/0000267 A1 | 1/2003 | Jacob et al. |
| 2004/0237613 A1 | 12/2004 | Shimura et al. |
| 2007/0062229 A1 * | 3/2007 | Miyata et al. ................... 70/408 |

FOREIGN PATENT DOCUMENTS

| | | |
|---|---|---|
| JP | 49-58946 | 5/1974 |
| JP | 08-105479 | 4/1996 |
| JP | 08-203377 | 8/1996 |
| JP | 2000-320202 | 11/2000 |
| JP | 2001-323957 | 11/2001 |
| WO | WO 01/48342 A1 | 7/2001 |

\* cited by examiner

Insertion Direction ←

Removal Direction →

Insertion Direction ←

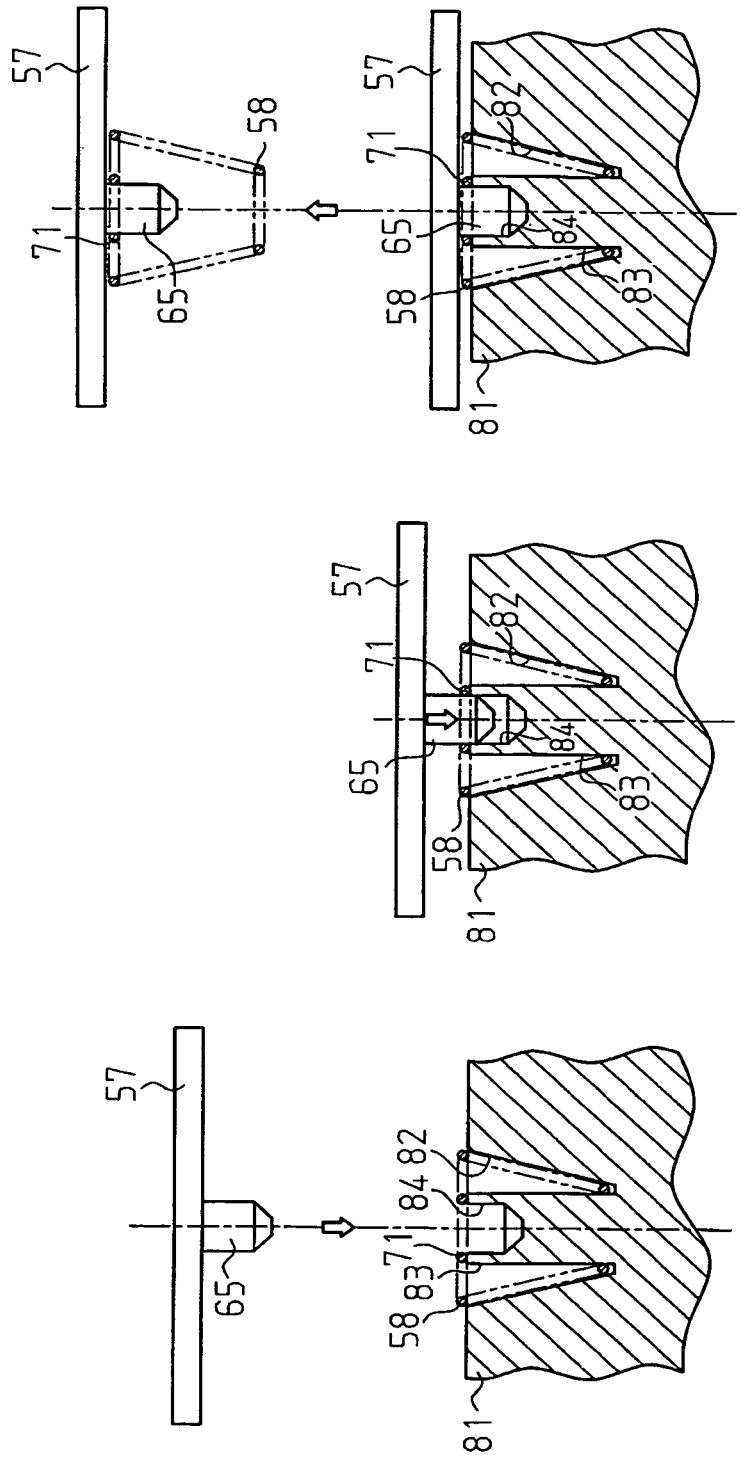

Fig. 13
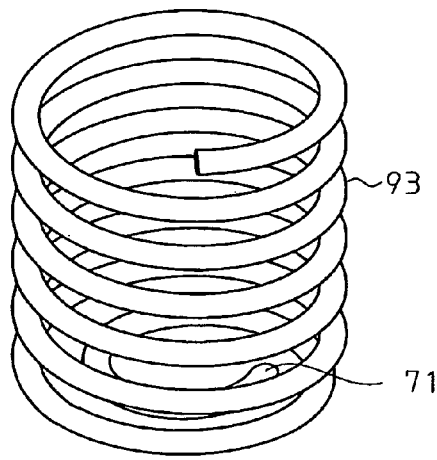
Fig. 14A    Fig. 14B    Fig. 14C
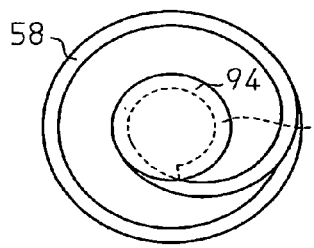 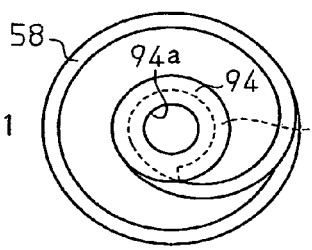 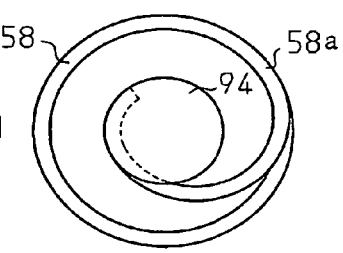
Fig. 15A    Fig. 15B
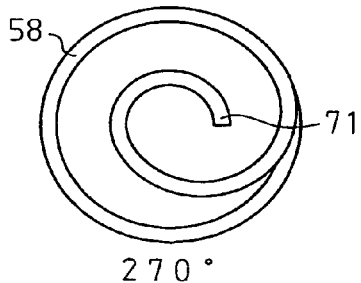 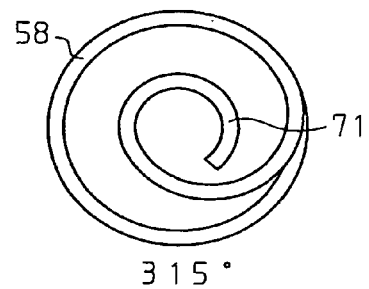
270°        315°

PORTABLE DEVICE INCLUDING MECHANICAL KEY

CROSS-REFERENCE TO RELATED APPLICATIONS

This application is based upon and claims the benefit of priority from the prior Japanese Patent Applications No. 2005-344670, filed on Nov. 29, 2005, and No. 2005-344671, filed on Nov. 29, 2005, the entire contents of which are incorporated herein by reference.

BACKGROUND OF THE INVENTION

The present invention relates to a portable device for electronically locking and unlocking a specific lock through, for example, predetermined wireless communication, and to a mechanical key accommodated in the portable device.

Japanese Laid-Open Patent Publication No. 2000-320202 describes an electronic key system in the prior art. The electronic key system automatically locks or unlocks a door of a vehicle, such as an automobile, when a user carrying a portable device approaches a door. The electronic key system further permits the engine to start when the user enters the vehicle interior and sits on the driver seat. In this electronic key system, wireless communication is automatically established between the portable device and the vehicle. When communication is established, the electronic key system locks or unlocks the door and permits the engine to start. In detail, a controller of the vehicle transmits a predetermined request signal to the portable device in predetermined cycles to detect the position of the portable device. The portable device receives a request signal from the controller when the user enters a predetermined area around the vehicle, and transmits an ID signal containing an ID code, which is prerecorded in the portable device, to the controller. The controller compares the ID code of the portable device contained in the ID signal transmitted from the portable device with an ID code of the vehicle prerecorded in the controller. When the ID codes are identical, the controller automatically unlocks the door and permits the engine to start.

The portable device includes a case accommodating electronic circuits such as a transmission and reception circuits mounted on a circuit board and a battery for supplying power to the electronic circuits. The portable device performs wireless communication with the vehicle using power supplied from the battery. When the voltage of the battery decreases to a predetermined value or lower, that is, when the battery is drained, the portable device cannot perform wireless communication with the vehicle. This disables wireless control, which is executed through the communication, for locking and unlocking the door or permitting the engine to start. Wireless communication between the portable device and the vehicle may also be disabled when, for example, the portable device fails to function for one reason or another. In the prior art, to lock or unlock the door during an emergency, that is, when the portable device is drained or the portable device fails to function, for example, the portable device has a mechanical key for mechanically locking and unlocking the door. The user first operates an operation knob of a lock mechanism arranged in the case to unlock the mechanical key. The user then operates an operation knob arranged on the mechanical key to slide the mechanical key within the case until the mechanical key projects out of the case. The user mechanically locks or unlocks the door using the mechanical key in case of an emergency.

In recent years, portable devices have been required to be downsized to improve portability. However, in the conventional portable device described above, the lock mechanism for supporting the mechanical key is accommodated in the case of the portable device. Further, the operation knob of the lock mechanism, which needs to be wide enough to be operable by the user, is arranged on one side surface of the case. Such structural requirements restrict downsizing, and particularly, thinning of the portable devices.

Moreover, user awareness of security for vehicles has become high in recent years. Electronic key systems, which are highly secure and highly convenient since a mechanical key does not have to be inserted into a key hole, have become popular. As a result, portable devices for electronic key systems are required to be downsized and further required to have improved manufacturing efficiency. Mechanical keys for the portable devices are manufactured in processes separate from the processes in which main bodies of the portable devices are manufactured. Thus, the mechanical keys are also inevitably required to have improved manufacturing efficiency.

SUMMARY OF THE INVENTION

The present invention provides a portable device having a downsized case while accommodating a mechanical key in an optimal manner, and a mechanical key mounted on such a portable device.

The present invention further provides a method and a jig for assembling a mechanical key that enables a portable device to be downsized and improves the manufacturing efficiency of the mechanical key and the portable device.

One aspect of the present invention is a portable device for electronically locking and unlocking a lock through wireless communication. The portable device includes a mechanical key for mechanically locking and unlocking the lock. The mechanical key includes an opening and an internal space in communication with the opening. An engagement member is arranged in the internal space of the mechanical key. The engagement member is movable between a first position at which part of the engagement member projects from the opening and a second position at which the engagement member is substantially accommodated in the mechanical key. A resilient member, arranged in the internal space of the mechanical key, urges the engagement member toward the first position from the second position. A case including a key accommodation portion removably accommodates the mechanical key. The key accommodation portion includes an engaged portion engaged with the engagement member that projects from the opening at the first position when the mechanical key is accommodated in the key accommodation portion. The resilient member includes a fixing portion arranged in the internal space and fixed to the mechanical key.

A further aspect of the present invention is a mechanical key for arrangement in a case of a portable device for electronically locking and unlocking a lock through wireless communication in which the mechanical key is for mechanically locking and unlocking the lock. The case includes a key accommodation portion for removably accommodating the mechanical key. The mechanical key includes a main body including an opening and an internal space in communication with the opening. An engagement member is arranged in the internal space of the mechanical key. The engagement member is movable between a first position at which part of the engagement member projects from the opening and a second position at which the engagement member is substantially accommodated in the main body. A resilient member, arranged in the internal space of the mechanical key, urges the engagement member toward the first position from the second position. The key accommodation portion includes an engaged portion engageable with the engagement member that projects from the opening at the first position when the mechanical key is accommodated in the key accommodation portion. The resilient member includes a fixing portion arranged in the internal space and fixed to the mechanical key.

Another aspect of the present invention is a method for assembling a mechanical key for arrangement in a case of a portable device for electronically locking and unlocking a lock through wireless communication in which the mechanical key is for mechanically locking and unlocking the lock. The case includes a key accommodation portion for removably accommodating the mechanical key. The method includes arranging an engagement member, which is engageable with an engaged portion formed in the key accommodation portion, in an internal space formed in a main body of the mechanical key, in which the internal space is in communication with an opening formed in the mechanical key, and the engagement member is movable between a first position at which part of the engagement member projects from the opening and engages with the engaged portion and a second position at which the engagement member is substantially accommodated in the mechanical key. The method further includes fixing a fixing portion arranged on a coil spring, which urges the engagement member from the second position toward the first position, to an inner surface of a cover defining the internal space, and attaching the cover, to which the coil spring is fixed, to the main body of the mechanical key with the coil spring held between the cover and the engagement member.

A further aspect of the present invention is a jig for assembling a mechanical key for arrangement in a case of a portable device for electronically locking and unlocking a lock through wireless communication in which the mechanical key is for mechanically locking and unlocking the lock. The case includes a key accommodation portion for removably accommodating the mechanical key. The mechanical key includes a main body, a cover attached to the main body and having an inner surface on which a protrusion is formed, a coil spring arranged in an internal space defined by the main body and the cover and fixed to the protrusion of the cover, and an engagement member arranged in the internal space and engaged with an engaged portion formed on the key accommodation portion by urging force of the coil spring. The coil spring includes a first winding portion and a second winding portion having a diameter smaller than that of the first winding portion and fitted to the protrusion of the cover. The jig includes a support member insertable into the coil spring and having a distal end surface that comes into contact with the second winding portion of the coil spring. A positioning recess, formed in the distal end surface of the support member, enables insertion of the protrusion of the cover.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 10A is a schematic cross-sectional view of the jig of FIG. 9 showing a process for setting the coil spring on the second cover;

FIG. 10B is a schematic cross-sectional view of the jig of FIG. 9 showing the process for setting the coil spring on the second cover;

FIG. 10C is a schematic cross-sectional view of the jig of FIG. 9 showing the process for setting the coil spring on the second cover;

FIG. 13 is a schematic perspective view showing a coil spring according to another embodiment of the present invention;

FIG. 14A is a schematic bottom view showing a coil spring according to another embodiment of the present invention;

FIG. 14B is a schematic bottom view of a coil spring according to another embodiment of the present invention;

FIG. 14C is a schematic bottom view of a coil spring according to another embodiment of the present invention;

FIG. 15A is a schematic bottom view of a coil spring according to another embodiment of the present invention;

FIG. 15B is a schematic bottom view of a coil spring according to another embodiment of the present invention;

DETAILED DESCRIPTION OF THE PREFERRED EMBODIMENTS

Figure 1:
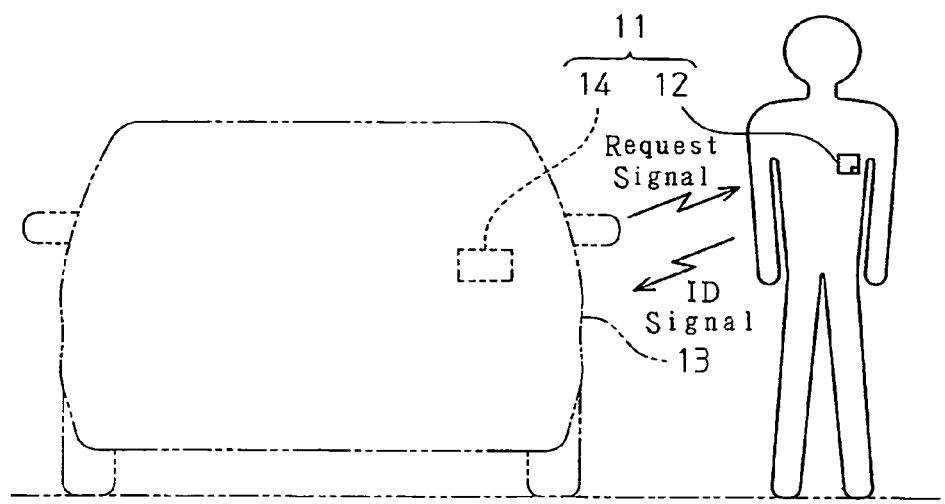
FIG. 1 is a schematic view showing the structure of an electronic key system according to a first embodiment of the present invention.

In the drawings, like numerals are used for like elements throughout.

A portable device 12 according to a first embodiment of the present invention will now be described with reference to FIGS. 1 to 10. The portable device 12 of the first embodiment is a card-type device. The portable device 12 electronically locks and unlocks, for example, a door of a vehicle via wireless communication.

<Outline of Electronic Key System 11>

As shown in FIG. 1, an electronic key system 11 includes the card-type portable device 12 and a controller 14 installed in a vehicle 13. When a user carrying the portable device 12 enters a predetermined area around the vehicle 13, the portable device 12 receives a request signal transmitted from the controller 14. The request signal requests the portable device 12 to transmit an ID code. When receiving the request signal, the portable device 12 transmits an ID signal containing an ID code, which is prerecorded in the portable device 12, to the controller 14. When receiving the ID signal transmitted from the portable device 12, the controller 14 compares the ID code of the portable device with an ID code of the vehicle 13 that is prerecorded in the controller 14. When the ID codes are identical, the controller 14 unlocks the door.

When the user carrying the portable device 12 moves away from the vehicle 13 and moves out of the predetermined area, the controller 14 cannot receive the ID signal (ID code) transmitted from the portable device 12. When the controller 14 cannot receive the ID code of the portable device 12, the controller 14 locks the door of the vehicle 13. In this way, the door is locked and unlocked without requiring the user to touch the vehicle 13.

<Portable Device 12>

Figure 2:
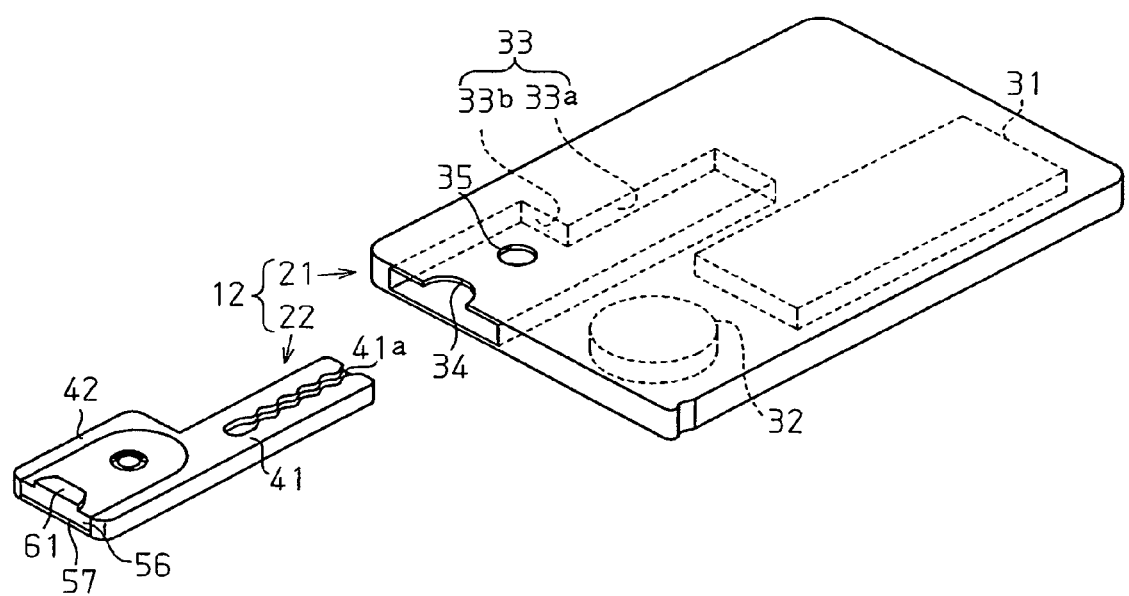
FIG. 2 is a schematic perspective view showing a portable device of FIG. 1.

The structure of the portable device 12 will now be described in detail. As shown in FIG. 2, the portable device 12 includes a case 21 and a mechanical key 22. The mechanical key 22 is removably accommodated in the case 21.

<Case 21>

The case 21 is formed as a card or a rectangular plate. The case 21 is made of a synthetic resin material, such as polybutylene terephthalate (PBT). As indicated by dotted lines in FIG. 2, the case 21 contains electronic components including a circuit board 31 and a battery 32. Various electronic circuits, such as an IC chip storing the ID code of the portable device 12 and transmission and reception circuits, are mounted on the circuit board 31. The battery 32 supplies operating power to the electronic circuits mounted on the circuit board 31.

The case 21 has a first short side and a second short side that are substantially parallel to each other. The case 21 has a key accommodation portion 33 (hereafter, the accommodation portion 33) for accommodating the mechanical key 22 that is inserted through an opening formed in the first short side (or the second short side) of the case 21. The accommodation portion 33 is formed in correspondence with the outer shape of the mechanical key 22. More specifically, the accommodation portion 33 includes a first accommodation portion 33a corresponding to a key plate 41 of the mechanical key 22 and a second accommodation portion 33b corresponding to a grip 42 of the mechanical key 22. The second accommodation portion 33b has a greater width than the first accommodation portion 33a. The first and second accommodation portions 33a and 33b are in communication with each other. Accordingly, the accommodation portion 33 is L-shaped.

The case 21 has a first surface and a second surface that are substantially parallel to each other. A semi-circular notch 34 is formed in the first surface (or the second surface) of the case 21 at the opening of the accommodation portion 33 formed in the first short side of the case 21. Further, an engagement hole 35 is formed on the first surface of the case 21 near the center of the second accommodation portion 33b. The engagement hole 35 forms an engaged portion of the present invention.

<Mechanical Key 22>

As shown in FIG. 2, the mechanical key 22 is a substantially L-shaped flat plate having a predetermined width. The mechanical key 22 is made of a metal material, such as aluminum. The mechanical key 22 includes the key plate 41, which is inserted in a key hole formed in the door lock of the vehicle, and the grip 42, which is arranged at one end of the key plate 41 and formed integrally with the key plate 41. The key plate 41 and the grip 42 form a main body of the mechanical key of the present invention. The grip 42 is formed to extend sideward from the key plate 41. A key groove 41a, which extends in the direction the mechanical key 22 is inserted into the key hole, is formed in the surface of the key plate 41.

Figure 3:
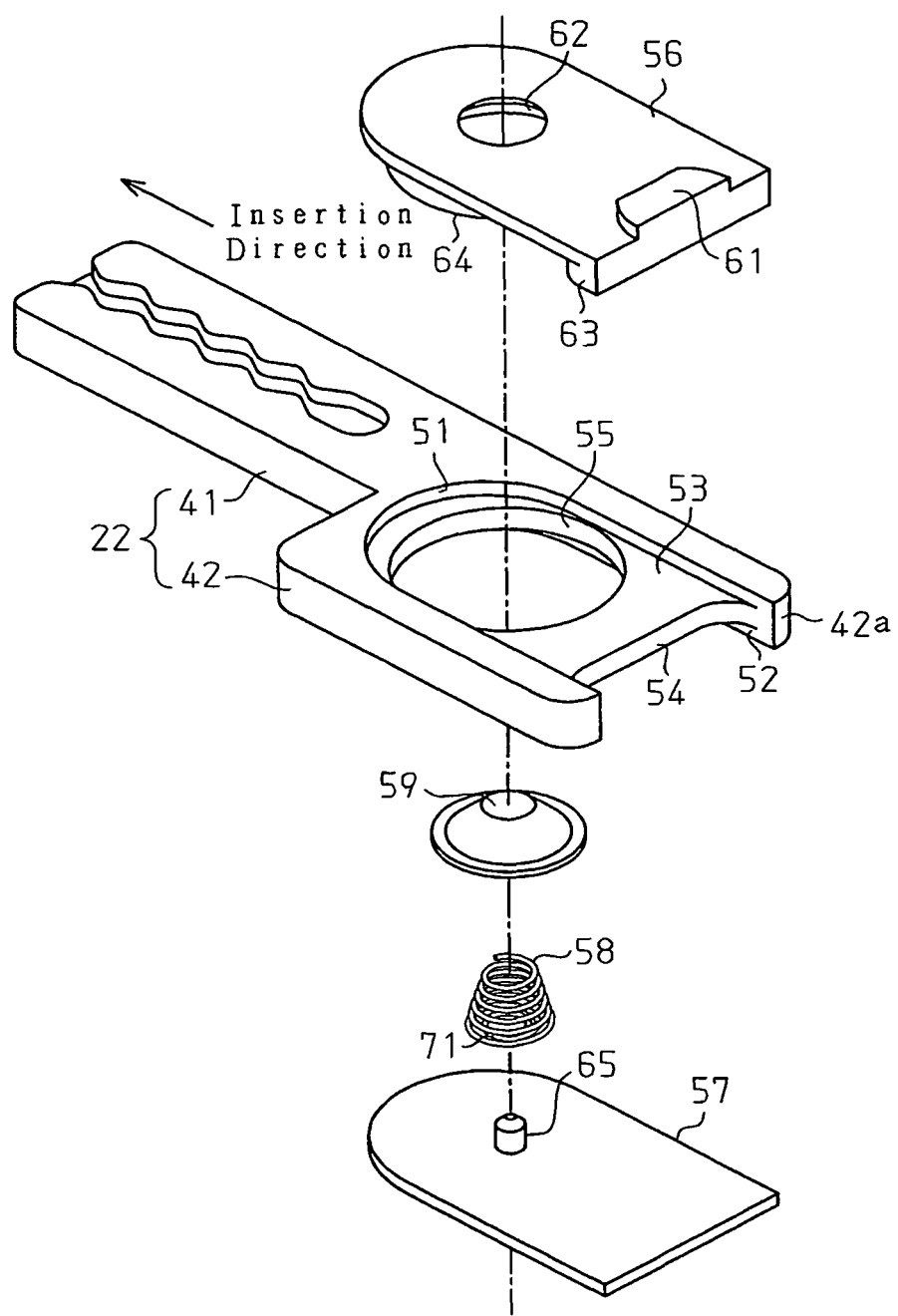
FIG. 3 is a schematic exploded perspective view of a mechanical key shown in FIG. 2.

As shown in FIG. 3, a first fitting portion 51 is formed in a first surface (upper surface in FIG. 3) of the grip 42 of the mechanical key 22. The first fitting portion 51 is bell-shaped recess formed in the first surface of the grip 42. A second fitting portion 52, which is bell-shaped and similar to the first fitting portion 51, is formed in a second surface (lower surface in FIG. 3) of the grip 42 opposite the first surface. The second fitting portion 52 is a recess formed in the second surface of the grip 42. The first and second fitting portions 51 and 52 are so that they open at a basal end 42a of the grip 42 in the insertion direction of the mechanical key 22. The first and second fitting portions 51 and 52 form a bell-shaped thin portion 53 in the grip 42, which has a smaller thickness than other portions of the grip 42. A notch 54 is formed at a basal end of the thin portion 53 in the insertion direction of the mechanical key 22. The notch 54 is formed by cutting out the basal end 42a of the grip 42. Further, the thin portion 53 has a fitting hole 55. The fitting hole 55 is formed to be coaxial with the engagement hole 35 of the case 21 when the mechanical key 22 is accommodated in the accommodation portion 33.

A first cover 56, a second cover 57, a coil spring 58, and a hook 59 are attached to the grip 42.

<First Cover 56>

Figure 4A:
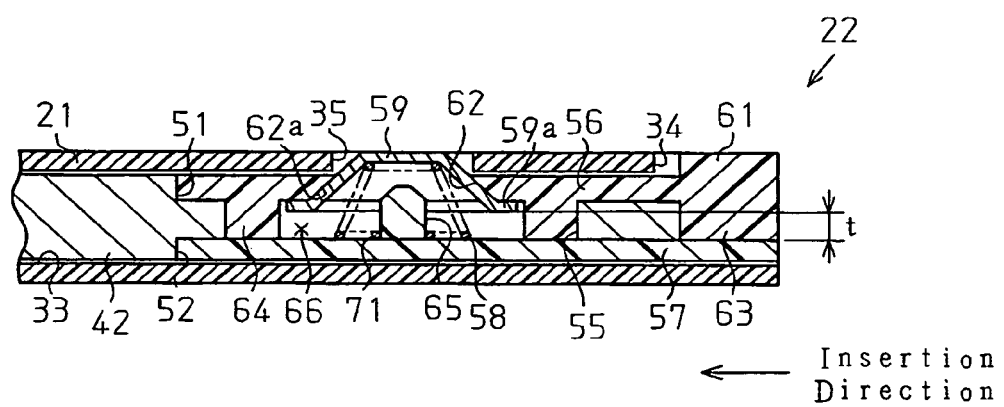
FIG. 4A is a schematic cross-sectional view of the portable device showing the mechanical key of FIG. 2 in an accommodated state.

As shown in FIG. 4A, the first cover 56 is set on the first fitting portion 51 of the grip 42. The first cover 56 is a bell-shaped plate (refer to FIG. 3) and made of a synthetic resin material so that the first cover 56 can be fitted to the first fitting portion 51. The thickness of the first cover 56 is set so that the surface of the first cover 56 is continuous to the surface of the mechanical key 22 when the first cover 56 is fitted in the first fitting portion 51. A gripping projection 61 is formed at a basal end of the first cover 56 in the insertion direction of the mechanical key 22. The gripping projection 61 projects from the surface of the first cover 56.

Figure 5:
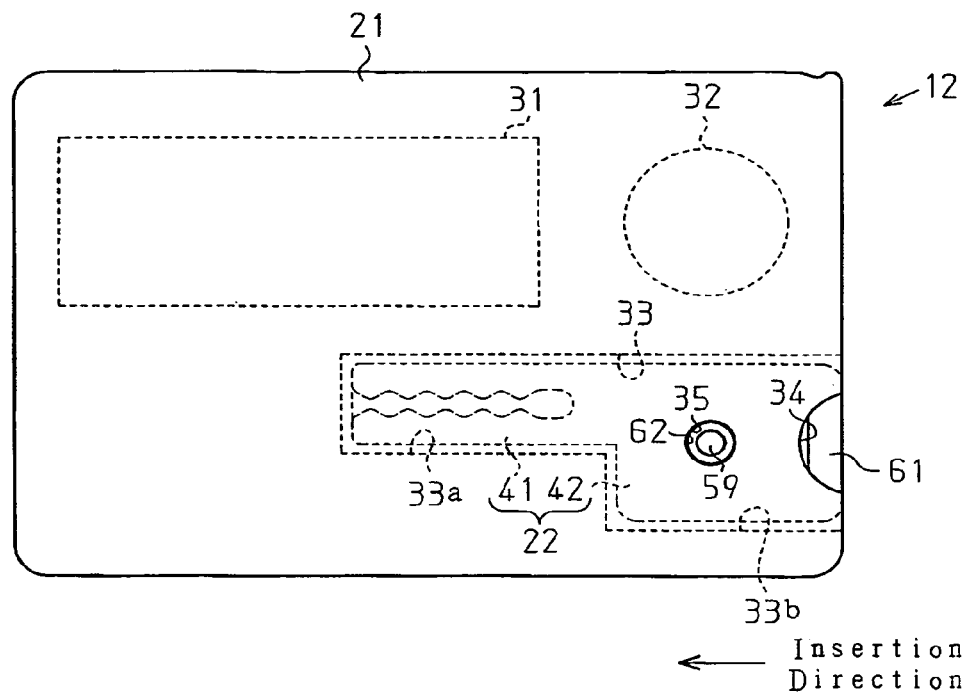
FIG. 5 is a schematic plan view showing the portable device of FIG. 2.
Figure 6:
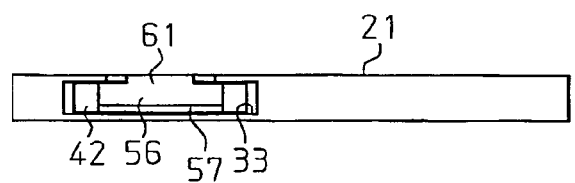
FIG. 6 is a schematic side view showing the portable device of FIG. 5.

As shown in FIG. 5, the gripping projection 61 is fitted in the semi-circular notch 34 of the case 21 when the mechanical key 22 is accommodated in the accommodation portion 33. In the first embodiment, the gripping projection 61 is generally trapezoidal when viewed from a direction perpendicular to the insertion direction of the mechanical key 22. The gripping projection 61 preferably has two arcuate sides in correspondence with the arc of the semi-circular notch 34. More preferably, the gripping projection 61 is formed so that a substantially crescent gap is formed between the arcuate surface of the notch 34 and the surface of the gripping projection 61 facing the arcuate surface of the notch 34 when the mechanical key 22 is accommodated in the accommodation portion 33. The crescent gap enables easy removal of the mechanical key 22 from the case 21. Further, as shown in FIG. 6, the gripping projection 61 is formed so that the upper surface of the gripping projection 61 is continuous to the surface of the case 21 when the mechanical key 22 is accommodated in the accommodation portion 33 (refer to FIG. 6).

As shown in FIG. 3, a through hole 62 is formed in the first cover 56. The diameter of the through hole 62 is smaller than the diameter of the fitting hole 55 of the thin portion 53. The through hole 62 is coaxial with the fitting hole 55 when the first cover 56 is attached to the grip 42. As shown in FIG. 4A, the through hole 62 is formed by a tapered surface 62a having an inner diameter that decreases from the inside toward the outside of the first cover 56.

As shown in FIG. 3, a first welding portion 63 is formed at a basal end surface of the first cover 56 in the insertion direction of the mechanical key 22. The first welding portion 63 projects from the inner surface of the first cover 56. The first welding portion 63 is formed in correspondence with the shape of the notch 54 of the thin portion 53. Thus, when the first cover 56 is attached to the grip 42, the first welding portion 63 is fitted in the notch 54 of the thin portion 53. As shown in FIG. 4A, the height of the first welding portion 63 is set so that the lower surface of the first welding portion 63 is continuous to the inner surface of the second fitting portion 52 when the first cover 56 is attached to the grip 42.

As shown in FIG. 3, a second welding portion 64 is formed on the inner surface of the first cover 56. The second welding portion 64 is in an annular shape surrounding the through hole 62. The second welding portion 64 is formed to be coaxial with the through hole 62. More specifically, the outer diameter of the second welding portion 64 is substantially the same as the inner diameter of the fitting hole 55 of the grip 42, and the inner diameter of the second welding portion 64 is greater than the inner diameter of the through hole 62. More specifically, the second welding portion 64 is fitted in the fitting hole 55 of the grip 42 when the first cover 56 is set on the first fitting portion 51 as shown in FIG. 4A. Further, the height of the second welding portion 64 is set so that the lower surface of the second welding portion 64 is continuous to the surface of the second fitting portion 52 when the first cover 56 is set on the first fitting portion 51. The first cover 56 forms a side wall of a mechanical key of the present invention.

<Second Cover 57>

As shown in FIG. 3, the second cover 57 is set on the second fitting portion 52 of the grip 42. The second cover 57 is formed as a bell-shaped plate and made of a synthetic resin material so that the second cover 57 can be fitted in the second fitting portion 52. As shown in FIG. 4A, the thickness of the second cover 57 is set so that the lower surface of the second cover 57 is continuous to the surface of the grip 42 when the second cover 57 is fitted in the second fitting portion 52.

Figure 7A:
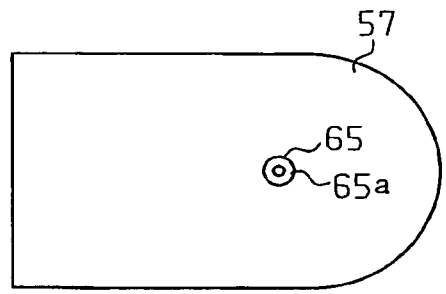
FIG. 7A is a schematic plan view showing a second cover of the mechanical key of FIG. 3.
Figure 7B:
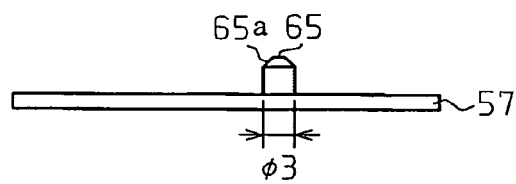
FIG. 7B is a schematic side view of the second cover shown in FIG. 7A.

As shown in FIG. 7A, a cylindrical protrusion 65 is formed on the surface of the second cover 57. The protrusion 65 forms a fitting portion of the present invention. As shown in FIG. 7B, a conical surface 65a is formed on a distal portion of the protrusion 65 in a manner that the width of the protrusion 65 decreases toward the tip of the protrusion 65. The outer diameter of the protrusion 65 is smaller than the inner diameter of the fitting hole 55 of the grip 42. The protrusion 65 is formed to be coaxial with the fitting hole 55 when the second cover 57 is fitted in the second fitting portion 52.

Referring to FIG. 4A, the distal end surfaces of the first and second welding portions 63 and 64 (lower surfaces in FIG. 4A) of the first cover 56 are welded to the surface (upper surface in FIG. 4A) of the second cover 57. In this way, the first and second cover 56 and 57 are fixed to the thin portion 53 by welding. A space having a circular cross-section and serving as an accommodation portion 66 is formed between the second cover 57 and the annular second welding portion 64 of the first cover 56. The accommodation portion 66 accommodates the coil spring 58 and the hook 59. The accommodation portion 66 forms an internal space of the present invention.

<Coil Spring 58>

Figure 8A:
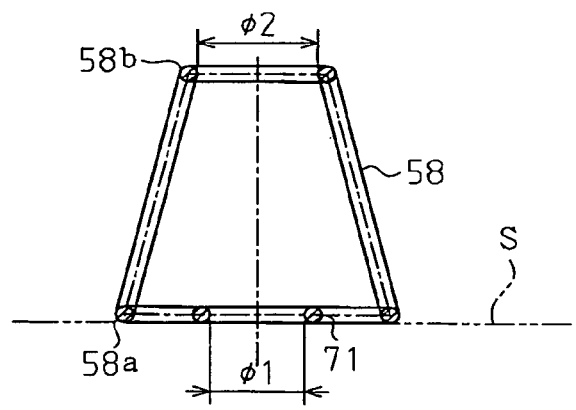
FIG. 8A is a schematic front view showing a coil spring of the mechanical key of FIG. 3.
Figure 8B:
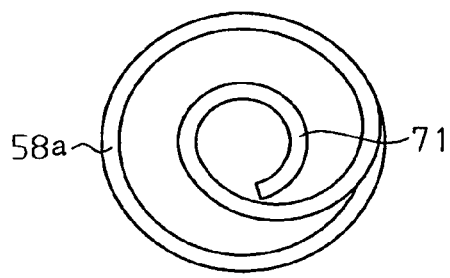
FIG. 8B is a schematic bottom view of the coil spring shown in FIG. 8A.

As shown in FIG. 8A, the diameter (average diameter) of the coil spring 58 decreases from one end to the other end. In other words, the coil spring 58 is formed to be generally conical. The coil spring 58 includes a seat portion 58a having a relatively large diameter and a seat portion 58b having a relatively small diameter. The coil spring 58 further includes a winding portion 71 arranged in the center of the seat portion 58a. The winding portion 71 has a smaller diameter than the seat portion 58a and is formed integrally with the seat portion 58a. As shown in FIG. 8B, the winding portion 71 is formed by winding an end portion of the coil spring 58 into an arcuate shape toward the center of the seat portion 58a. The winding portion 71 is formed by about one winding (about 360 degrees) that forms a circle. As shown in FIG. 8A, the axis of the winding portion 71 and the axis of the coil spring 58 substantially coincide with each other. Further, the winding portion 71 and the end (seat portion 58a) of the coil spring 58 are formed on substantially the same virtual plane S. More specifically, the coil spring 58 includes a first end portion formed by the winding portion 71 and the seat portion 58a and a second end portion opposite the first end portion and formed by the seat portion 58b.

The diameter of the winding portion 71 (inner diameter $\Phi 1$) is set to be smaller than the diameter of the seat portion 58b (inner diameter $\Phi 2$) of the coil spring 58 $\Phi 1 < \Phi 2$). Further, the inner diameter $\Phi 1$ of the winding portion 71 is substantially the same as the outer diameter $\Phi 3$ of the protrusion 65 of the second cover 57 (refer to FIG. 7B). Thus, the protrusion 65 of the second cover 57 can be fitted to the winding portion 71. As shown in FIG. 4A, when the winding portion 71 is fitted to the protrusion 65 of the second cover 57, the seat portion 58a and the winding portion 71 of the coil spring 58 are supported on the upper surface of the second cover 57. The seat portion 58a forms a first winding portion of the present invention. The coil spring 58 forms a resilient member of the present invention. The winding portion 71 forms a fixing portion (second winding portion) of the present invention. The seat portion 58b forms a third winding portion of the present invention.

<Hook 59>

As shown in FIG. 4A, the hook 59 is placed on the small-diameter end portion of the coil spring 58. The hook 59 is conical and made of a metal material. In detail, the hook 59 is tubular and has a closed top end and an open bottom end. The angle at which the side surface of the hook 59 is tapered is set to be substantially the same as the angle of the tapered surface 62a defining the through hole 62 of the first cover 56. An annular flange 59a is formed around the rim at the opening of the hook 59. The outer diameter of the top end of the hook 59 is set to be smaller than the diameter of the small-diameter opening of the through hole 62 of the first cover 56. One end (seat portion 58b) of the coil spring 58 is inserted through the opening of the hook 59 and is in contact with the inner surface of the top end of the hook 59. The top end of the hook 59 is inserted in the through hole 62 inside the first cover 56.

The hook 59 is constantly urged outward (upward as viewed in FIG. 4A) by an elastic force applied by the coil spring 58. As shown in FIG. 4A, the flange 59a, which is engaged with the rim at the opening of the through hole 62 of the first cover 56, restricts outward movement of the hook 59. When the flange 59a is engaged with the first cover 56, the elastic force of the coil spring 58 causes a generally upper half portion of the hook 59 (portion between its middle and top) to project from the outer surface of the first cover 56. More specifically, when the mechanical key 22 is accommodated in the accommodation portion 33, the top end portion of the hook 59 projects from the outer surface of the first cover 56 and is located in the engagement hole 35 of the case 21. In this state, the top surface of the hook 59 is continuous to the outer surface of the case 21.

When the flange 59a is engaged with the first cover 56, the hook 59 has a generally lower half portion (portion between its middle and the flange 59a) that is in contact with the tapered surface 62a of the through hole 62 of the first cover 56. Further, as shown in FIG. 4A, when the flange 59a is engaged with the first cover 56, a gap t is formed between the flange 59a and the surface of the second cover 57. Thus, the hook 59 is movable toward the second cover 57 against the elastic force of the coil spring 58 by the distance corresponding to the gap t.

Figure 4B:
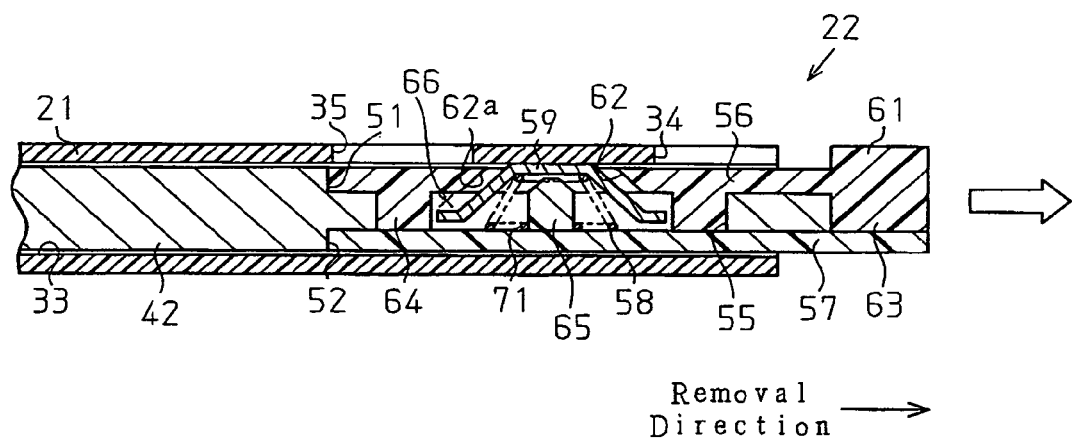
FIG. 4B is a schematic cross-sectional view of the portable device showing the mechanical key of FIG. 2 in a removed state.

In the first embodiment, the gap t is set in a manner that the hook 59 is movable between the first position shown in the state of FIG. 4A and the second position shown in the state of FIG. 4B. When the hook 59 moves to the first position, the flange 59a of the hook 59 is engaged with the first cover 56. The top end portion of the hook 59 projects from the outer surface of the first cover 56, or from the surface of the mechanical key 22, and is arranged within the engagement hole 35 of the case 21. When the hook 59 moves to the second position, the flange 59a is disengaged from the first cover 56. In this state, the top end portion of the hook 59 substantially does not project from the surface of the mechanical key 22. The hook 59 forms an engagement member of the present invention.

<Method for Assembling Mechanical Key 22>

The method for assembling the mechanical key 22 will now be described.

First, the first cover 56 is set on the first fitting portion 51 of the grip 42. As a result, the first welding portion 63 is fitted in the notch 54 of the grip 42 and the second welding portion 64 is fitted in the fitting hole 55 of the grip 42.

Next, the mechanical key 22, which is undergoing assembling processes, is placed on a workbench (not shown) in a manner that the second fitting portion 52 of the grip 42 faces upward.

Then, the hook 59 is arranged in the through hole 62 of the first cover 56 through the fitting hole 55 in a manner that the top end of the hook 59 faces the first cover 56. In other words, the hook 59 is placed on the workbench via the through hole 62 of the first cover 56.

Next, the second cover 57 is fitted in the second fitting portion 52 of the grip 42. In this state, the coil spring 58 is attached beforehand to the second cover 57. In detail, the coil spring 58 is attached to the second cover 57 using a jig 81 before the second cover 57 is attached to the grip 42. The second cover 57 is set on the second fitting portion 52 of the grip 42 in a manner that the seat portion 58b of the coil spring 58 is arranged inside the hook 59. The winding portion 71 of the coil spring 58 is fitted to the protrusion 65 of the second cover 57. This prevents the coil spring 58 from being separated from the second cover 57 when the second cover 57 is set on the second fitting portion 52. Thus, attachment of the second cover 57 is performed smoothly.

During the attaching of the second cover 57, the coil spring 58 is compressed between the hook 59 and the second cover 57. With the winding portion 71 being fitted to the protrusion 65, the coil spring 58 does not move relative to the second cover 57 even when the coil spring 58 is compressed. This further prevents the coil spring 58 from being separated from the second cover 57 or rattling with respect to the second cover 57. During the attaching of the second cover 57, the coil spring 58 is fixed to the second cover 57 in a stable manner. This enables the second cover 57 to be smoothly set on the second fitting portion 52. As a result, the coil spring 58 is smoothly fixed at an appropriate position of the second cover 57, that is, an appropriate position within the accommodation portion 66.

Finally, the first and second welding portions 63 and 64 of the first cover 56 are welded to the second cover 57. This completes the manufacture of the mechanical key 22.

In the first embodiment, the coil spring 58 does not have to include the winding portion 71, and the protrusion 65 of the second cover 57 may be fitted to the seat portion 58a of the coil spring 58. However, because the coil spring 58 would be compressed to increase the diameter of its seat portion 58a when attaching the second cover 57, the seat portion 58a of the coil spring 58 may be separated from the protrusion 65 and the coil spring 58 may be separated from the second cover 57. Further, the coil spring 58 may be fixed in an unstable manner, and the position of the coil spring 58 may be unstable. In this case, the efficiency of the operation of attaching the second cover 57 to the grip 42 decreases. As a result, the efficiency of the assembling operation of the mechanical key 22 may decrease.

<Jig 81 for Setting Coil Spring 58>

Figure 9:
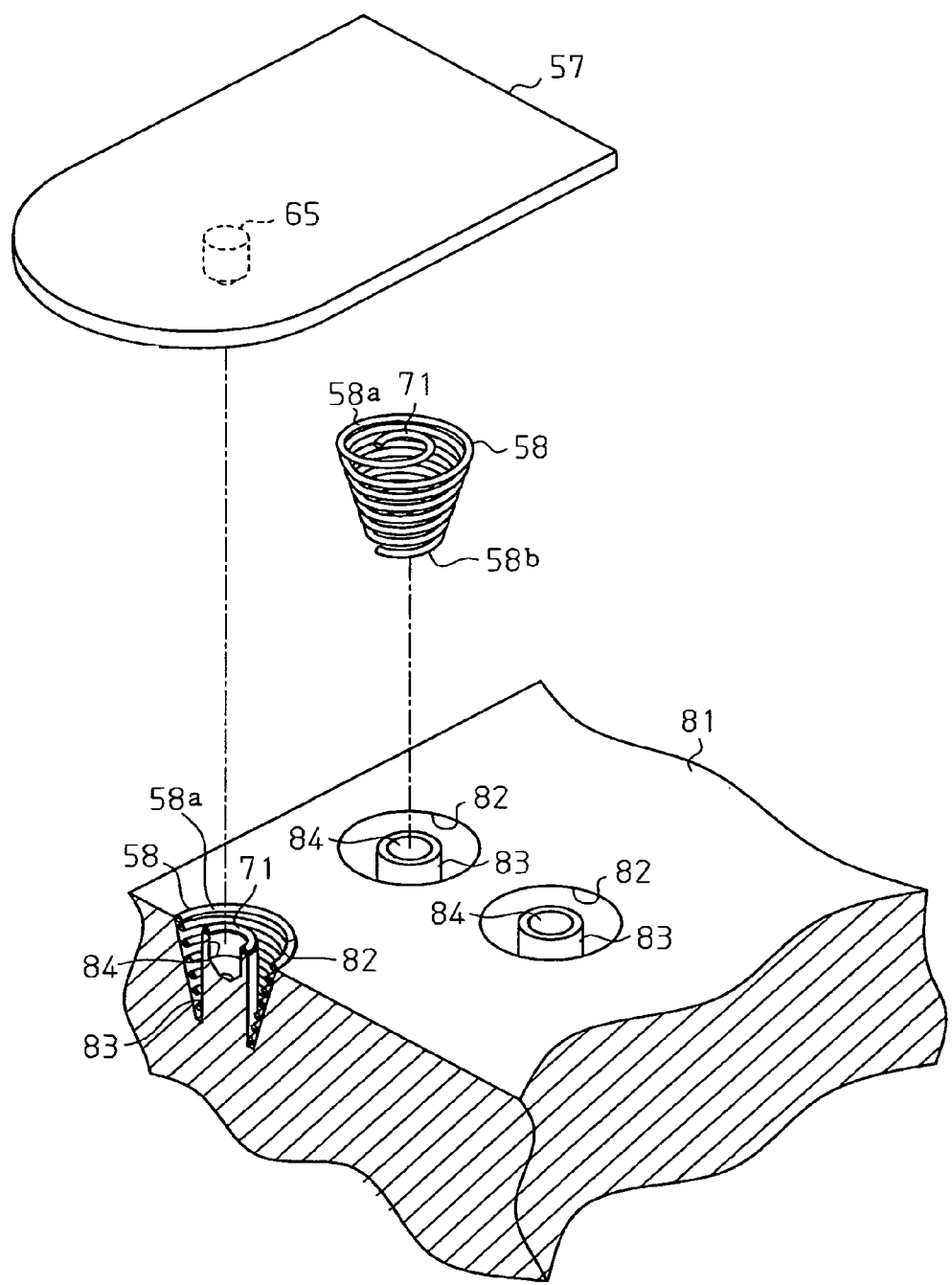
FIG. 9 is a schematic cross-sectional view of a jig used to set the coil spring of FIG. 8A on the second cover of FIG. 7A.

The jig 81 used to set the coil spring 58 on the protrusion 65 of the second cover 57 will now be described. As shown in FIG. 9, the jig 81 is a flat plate. A plurality of spring accommodation recesses 82 are formed in an upper surface of the jig 81 at predetermined intervals in lateral and longitudinal directions. The diameter of each spring accommodation recess 82 decreases toward the inside (depthwise direction) of the jig 81. In other words, each spring accommodation recess 82 is formed to be conical in correspondence with the outer shape of the coil spring 58. The coil spring 58 is accommodated in the spring accommodation recess 82 in a manner that its seat portion 58b is placed on the bottom of the spring accommodation recess 82. The circumferential surface of the coil spring 58 comes in contact with the inner surface of the accommodation recess 82. The inner shape and the depth of each spring accommodation recess 82 is set in a manner that the seat portion 58a of the coil spring 58 does not project from the upper surface of the jig 81 when the coil spring 58 is accommodated in the spring accommodation recess 82.

A cylindrical support member 83 is arranged to project from the inner bottom surface of each spring accommodation recess 82. The outer diameter of the support member 83 is set to be substantially the same as the diameter (preferably the outer diameter) of the winding portion 71 of the coil spring 58 so that a large gap is not formed between the inner circumferential surface of the seat portion 58b of the coil spring 58 and the support member 83. A positioning recess 84, in which the protrusion 65 of the second cover 57 is fitted, is formed in the distal end surface of the support member 83. The positioning recess 84 is formed to correspond to the outer shape of the protrusion 65. The depth of the positioning recess 84 is preferably slightly greater than the height of the protrusion 65 projecting from the surface of the second cover 57. The outer diameter of the support member 83 may be changed in the depthwise direction. More specifically, the outer diameter of the support member 83 may be set in a manner that at least the distal end surface of the support member 83 comes in contact with the winding portion 71.

<Method for Setting Coil Spring 58 on Second Cover 57>

The method for setting the coil spring 58 on the second cover 57 will now be described. As shown in FIG. 10A, the coil spring 58 is accommodated in a spring accommodation recess 82 of the jig 81. The diameter (inner diameter $\Phi 2$) of the seat portion 58b of the coil spring 58 is greater than the diameter (inner diameter $\Phi 1$) of the winding portion 71. Thus, the coil spring 58 is smoothly fitted onto the support member 83. The outer diameter of the support member 83 is substantially the same as the outer diameter of the winding portion 71. Thus, the winding portion 71 is placed (supported) on the distal end portion of the positioning recess 84 of the support member 83. The circumferential surface of the coil spring 58 is then held in contact with the inner surface of the spring accommodation recess 82. If the inner diameter $\Phi 1$ of the winding portion 71 were to be set greater than the inner diameter $\Phi 2$ of the seat portion 58b, the outer diameter of the support member 83 needs to be set greater than the inner diameter of the seat portion 58b to support the winding portion 71 at the distal end portion of the support member 83. However, the coil spring 58 may not be readily fitted to the support member 83 in this case. Thus, the inner diameter $\Phi 1$ of the winding portion 71 is preferably set smaller than the inner diameter $\Phi 2$ of the seat portion 58b (refer to FIG. 8A).

Next, as shown in FIG. 10B, the protrusion 65 of the second cover 57 is inserted in the positioning recess 84. Then, referring to FIG. 10C, the second cover 57 is forced downward until the winding portion 71 is held between the second cover 57 and the distal end surface of the support member 83. This attaches the winding portion 71 to the basal end of the protrusion 65 on the second cover 57. The second cover 57 is lifted so that the coil spring 58 fitted to the basal end of the protrusion 65 is removed from the spring accommodation recess 82. In this manner, the coil spring 58 is easily attached to the second cover 57 simply by forcing the protrusion 65 into the positioning recess 84.

Without the jig 81, both the coil spring 58 and the second cover 57 need to be held when the winding portion 71 is set on the protrusion 65. In this case, when the coil spring 58 is forced against the second cover 57, the coil spring 58 is elastically deformed. Thus, the setting of the winding portion 71 to the protrusion 65 becomes extremely difficult. The second cover 57 may also be placed on the workbench in a manner that the protrusion 65 faces upward, and the coil spring 58 may be fitted to the protrusion 65 from above. However, the coil spring 58 is also elastically deformed in this case and the setting the coil spring 58 would be difficult.

In the first embodiment, the winding portion 71 is held on the distal end portion of the support member 83 when the coil spring 58 is set. Thus, even when the protrusion 65 forces the winding portion 71 downward, the winding portion 71 is supported by the distal end portion of the support member 83 and prevented from moving downward. Further, when the protrusion 65 is inserted into the winding portion 71 and the positioning recess 84, the coil spring 58 does not need to be held. This enables the fixing of the second cover 57 and the coil spring 58 to be performed smoothly.

<Example of Use of the Portable Device 12>

An example of use of the portable device 12 with the above-described structure will now be described.

<Normal Use>

During normal use, that is, when the portable device 12 is operable in a normal manner without battery drainage or a device failure, the user carries the portable device 12 with the mechanical key 22 accommodated in the accommodation portion 33. In this case, the door of the vehicle is locked or unlocked when the user moves in or out the predetermined area. When the mechanical key 22 is accommodated in the accommodation portion 33, the hook 59 is arranged at the first position (position shown in FIG. 4A). More specifically, the top portion of the hook 59 projects from the surface of the mechanical key 22 and is positioned in the engagement hole 35 of the case 21. This restricts movement of the mechanical key 22 in the direction in which the mechanical key 22 is pulled out for removal (removal direction). More specifically, the mechanical key 22 is prevented from being pulled out of the accommodation portion 66.

The hook 59 is constantly urged by the elastic force applied by the coil spring 58 that is accommodated in the accommodation portion 66 in the direction in which the hook 59 projects from the surface of the mechanical key 22. Thus, the hook 59 does not easily move inward. This ensures that the hook 59 remains projected from the surface of the mechanical key 22. Further, the protrusion 65 of the second cover 57 is fitted in the winding portion 71 of the coil spring 58. Thus, the coil spring 58 is constantly supported at an appropriate position within the accommodation portion 66. As a result, the coil spring 58 is prevented from moving or rattling in the accommodation portion 66. Further, the hook 59 is constantly subjected to the optimal elastic force of the coil spring 58. Thus, the engagement between the hook 59 and the engagement hole 35 of the case 21 is sufficiently strong. As a result, the mechanical key 22 is supported in a preferable manner in the accommodation portion 66.

The coil spring 58 is formed in a manner that the winding portion 71 and the end (seat portion 58a) of the coil spring 58 are arranged on substantially the same virtual plane S. Thus, both the winding portion 71 and the seat portion 58a are supported and fixed in contact with the inner bottom surface of the accommodation portion 66. As a result, the coil spring 58 is supported within the accommodation portion 66 in a stable manner.

In the first embodiment, a lock mechanism including the hook 59 and the coil spring 58 for supporting the mechanical key 22 on the case 21 is arranged inside the mechanical key 22. The lock mechanism does not increase the thickness of the mechanical key 22 more than necessary. More specifically, when the hook 59 is subjected to the pressure of the coil spring 58, the hook 59 is accommodated in the accommodation portion 66. Thus, the thickness of the mechanical key 22 does not increase. Further, a lock mechanism for supporting the mechanical key 22 in an accommodated state and an operation means for unlocking the lock of the lock mechanism and removing the mechanical key 22 from the case 21 do not additionally need to be arranged within the case 21. This downsizes or particularly thins the case 21, and improves the portability of the portable device 12.

<Emergency Use>

During use in a state of emergency, that is, when the portable device 12 is not normally operable due to battery drainage or a device failure, the user removes the mechanical key 22 from the case 21, and mechanically locks or unlocks the door of the vehicle 13 using the mechanical key 22. To remove the mechanical key 22 from the case 21, the user, for example, holds the gripping projection 61, which is exposed through the semi-circular notch 34 of the case 21, with his or her fingers and applies force in the removal direction of the mechanical key 22 (refer to FIG. 4B).

As a result, the hook 59 moves into the accommodation portion 66 against the elastic force of the coil spring 58. In detail, when the mechanical key 22 moves in the removal direction, the tapered side surface of the hook 59 is guided by the rim of the engagement hole 35 in the case 21. As a result, the hook 59 gradually moves into the accommodation portion 66. The coil spring 58 contracts as the hook 59 moves into the accommodation portion 66. When the hook 59 moves to the second position (FIG. 4B) at which the top end portion of the hook 59 enters the accommodation portion 33, the hook 59 and the engagement hole 35 of the case 21 are disengaged. As a result, the mechanical key 22 is unlocked, or becomes removable from the accommodation portion 33.

In the first embodiment, the axis of the winding portion 71 coincides with the axis of the coil spring 58. Thus, the protrusion 65 of the accommodation portion 66 is located at substantially the center of the coil spring 58. When, for example, the hook 59 moves from the first position to the second position at which the coil spring 58 is compressed, the coil spring 58 is prevented from bending sideward. Thus, the coil spring 58 is less likely to interfere with the protrusion 65. This enables the coil spring 58 to contract and expand smoothly as the hook 59 moves, and enables the hook 59 to move smoothly between the first position and the second position. Further, the coil spring 58 is conical and includes the seat portion 58a having a relatively large diameter and the seat portion 58b having a smaller diameter than the seat portion 58a, with the winding portion 71 formed on the seat portion 58a. Thus, when the hook 59 is at the second position, that is, when the coil spring 58 is being compressed by the hook 59, adjacent winding of the compressed coil spring 58 are prevented from overlapping with one another. This reduces the space of the accommodation portion 66 and decreases the thickness of the mechanical key 22.

The hook 59 is urged by the elastic force of the coil spring 58 in the direction in which the hook 59 projects from the surface of the first cover 56 even during removal of the mechanical key 22 from the accommodation portion 33. However, the movement of the hook 59 in the projecting direction is restricted since the top end of the hook 59 is in contact with the inner surface of the case 21 (accommodation portion 33). The top end of the hook 59 slides along the inner surface of the accommodation portion 33 as the mechanical key 22 is removed. When the hook 59 becomes exposed from the case 21, the elastic force of the coil spring 58 causes the hook 59 to return to the first position at which the hook 59 projects from the surface of the mechanical key 22.

After the mechanical key 22 is used, the mechanical key 22 is inserted into the case 21. When the key plate 41 of the mechanical key 22 is inserted into the accommodation portion 33, the top end portion of the hook 59 located at the first position is engaged with the rim of the opening of the accommodation portion 33. When the mechanical key 22 is forced into the accommodation portion 33, the tapered side surface of the hook 59 is guided by the surface round the opening of the accommodation portion 33, and the hook 59 is gradually moved into the accommodation portion 66. As a result, the hook 59 moves to the second position at which the top end portion of the hook 59 enters the accommodation portion 33. Subsequently, the mechanical key 22 is further pushed in the insertion direction. In this state, the mechanical key 22 is easily inserted with a small force because the hook 59 is supported at the second position. When the mechanical key 22 is inserted until the hook 59 is aligned with the engagement hole 35 of the case 21, the elastic force of the coil spring 58 causes the hook 59 to return to the first position. More specifically, the hook 59 is engaged with the engagement hole 35 of the case 21. As a result, the mechanical key 22 is prevented from being separated from the accommodation portion 33. This ensures that the mechanical key 22 is accommodated and supported within the case 21.

When the mechanical key 22 is removed from or arranged in the case 21, the coil spring 58 is elastically deformed, that is, the coil spring 58 contracts and expands, as the hook 59 moves between the first position (FIG. 4A) and the second position (FIG. 4B). If the coil spring 58 were not fixed in a stable manner and were movable within the accommodation portion 66, the hook 59 may not move smoothly between the first position and the second position. Further, it may be difficult to hold the hook 59 at the first position. In the first embodiment, the winding portion 71 of the coil spring 58 is fitted to the protrusion 65 of the second cover 57. This ensures that the coil spring 58 is supported at an appropriate position within the accommodation portion 66. Thus, the hook 59 moves smoothly and is held at the engaging position.

The first embodiment has the advantages described below.

(1) The engagement hole 35 is formed in the inner surface of the key accommodation portion 33. The mechanical key 22 includes the accommodation portion 66 having an opening. When the mechanical key 22 is accommodated in the key accommodation portion 33, the opening of the accommodation portion 66 and the engagement hole 35 are in communication with each other. The accommodation portion 66 includes the hook 59, which is movable in the thicknesswise direction of the mechanical key 22. The coil spring 58 for urging the hook 59 in the direction in which the hook 59 projects from the opening of the accommodation portion 66 is arranged between the hook 59 and the inner bottom surface of the accommodation portion 66. The coil spring 58 has the winding portion 71 that is fixed to the second cover 57.

When the mechanical key 22 is accommodated in the key accommodation portion 33, the elastic force of the coil spring 58 causes the hook 59 to project from the surface of the mechanical key 22 and engage with the engagement hole 35 of the key accommodation portion 33. In this engaged state (first position), the hook 59 is pressed by the elastic force of the coil spring 58. Thus, the hook 59 is prevented from easily moving inward into the accommodation portion 66. As a result, the engagement between the hook 59 and the engagement hole 35 is ensured. Further, the winding portion 71 of the coil spring 58 is fixed to the second cover 57 that defines the inner bottom surface of the accommodation portion 66. This prevents the coil spring 58 from moving or rattling within the accommodation portion 66. Thus, the coil spring 58 is supported at an appropriate position within the accommodation portion 66.

Accordingly, the coil spring 58 is held at the first position. The mechanical key 22 is prevented from being separated from the key accommodation portion 33. In other words, the mechanical key 22 is preferably supported in the key accommodation portion 33. Further, a lock mechanism for locking the mechanical key 22 in an accommodated state and an operation means for unlocking the lock of the lock mechanism and removing the key do not additionally need to be arranged in the case 21. This downsizes the case 21, and consequently downsizes the portable device 12.

(2) The winding portion 71 of the coil spring 58 is fitted to the protrusion 65 of the second cover 57. As a result, the coil spring 58 is fixed to the second cover 57. This simplifies the structure for fixing the coil spring 58 to the second cover 57. Further, the coil spring 58 and the second cover 57 are fixed together by simply fitting the winding portion 71 to the protrusion 65. This improves the efficiency in setting the coil spring 58 on the second cover 57.

(3) The winding portion 71, which has a smaller diameter than the coil spring 58, is formed integrally with the coil spring 58 at the end of the coil spring 58. The winding portion 71 is fitted to the protrusion 65 of the second cover 57.

Thus, when the hook 59 moves between the first position and the second position, the coil spring 58 is prevented from rattling or moving within the accommodation portion 66. This ensures that the coil spring 58 is supported at an appropriate position within the accommodation portion 66. The simple structure of arranging the winding portion 71 on the coil spring 58 enables the hook 59 to move smoothly and supports the hook 59 at the engaging position.

When the hook 59 moves between the first position and the second position, the coil spring 58 is elastically deformed (expands and contracts). If the coil spring 58 were to rattle or move within the accommodation portion 66, the hook 59 may not move smoothly between the first position and the second position. Further, the hook 59 may not be held at the first position. However, in the first embodiment, the coil spring 58 is supported at an appropriate position within the accommodation portion 66 without causing any of the problems described above.

(4) The winding portion 71 is formed in a manner that the axis of the winding portion 71 coincides with the axis of the coil spring 58. Thus, the protrusion 65 of the accommodation portion 66 is positioned at substantially the center of the coil spring 58. Even when the coil spring 58 is compressed and bent sideward, the coil spring 58 is less likely to interfere with the protrusion 65. Thus, the coil spring 58 expands and contracts smoothly as the hook 59 moves. Consequently, the hook 59 moves smoothly between the first position and the second position.

(5) The winding portion 71 and the end of the coil spring 58 are substantially arranged on the same virtual plane S. Thus, both the winding portion 71 and the end (seat portion 58a) of the coil spring 58 are fixed and supported in a state contacting the inner bottom surface of the accommodation portion 66. As a result, the coil spring 58 is supported within the accommodation portion 66 in a further stable manner.

(6) The coil spring 58 is conical and includes the seat portion 58a having a relatively large inner diameter, the seat portion 58b having a smaller inner diameter than the seat portion 58a, and the winding portion 71 formed on the same end as the seat portion 58a and having a smaller diameter than the seat portion 58b. Thus, when the hook 59 moves to the second position, the coil spring 58 is compressed with a small load. This enables reduction in the space of the accommodation portion 66 and consequently downsizes (particularly thins) the mechanical key 22.

(7) The inner diameter of the winding portion 71 is smaller than the inner diameter of the seat portion 58b of the coil spring 58. Thus, when the winding portion 71 is fitted to the protrusion 65 using the jig 81 (support member 83) having an outer diameter that is substantially the same as the inner diameter of the winding portion 71, pressure is uniformly applied to the winding portion 71. This enables the setting of the coil spring 58 to be performed smoothly.

(8) The protrusion 65 is formed integrally with the inner surface of the second cover 57. The protrusion 65 is fitted in the winding portion 71 of the coil spring 58. With this simple structure of the second cover 57, the coil spring 58 is supported within the accommodation portion 66 in a preferable manner.

(9) The method for assembling the mechanical key 22 in the first embodiment includes the three processes described below. In the first process, the hook 59 is arranged within the accommodation portion 66 of the mechanical key 22. More specifically, the hook 59 is arranged within the annular second welding portion 64 of the first cover 56. In the second process, the winding portion 71 of the coil spring 58 pressing the hook 59 is fitted to the protrusion 65 of the second cover 57. In the third process, the second cover 57 on which the coil spring 58 is set is attached to the grip 42 in a manner that the coil spring 58 is held between the second cover 57 and the hook 59.

With the method described above, one end of the coil spring 58 is fixed to the second cover 57. Thus, the position of the coil spring 58 on the second cover 57 is fixed. The coil spring 58 is compressed or bent when the second cover 57 is attached. However, the coil spring 58 is prevented from being separated from the second cover 57 or being deformed even when the coil spring 58 is compressed or bent. Further, the position of the coil spring 58 with respect to the second cover 57 is stable. This facilitates the attaching of the second cover 57. As a result, the assembling the mechanical key 22 is simplified. Consequently, the manufacturing efficiency of the portable device 12 is improved. If the coil spring 58 were not fixed ton the second cover 57, the position of the coil spring 58 with respect to the second cover 57 would not be stable. In this case, the coil spring 58 may be separated from the second cover 57 or deformed when the coil spring 58 is compressed or bent during the operation of attaching the second cover 57. As a result, the operation of attaching the second cover 57 becomes difficult, and the efficiency of the operation of assembling the mechanical key 22 may decrease.

(10) When the mechanical key 22 is in the accommodated state, the hook 59, which is being pressed by the elastic force of the coil spring 58, is engaged with the engagement hole 35 of the accommodation portion 33 at the first position. In this state, the hook 59 is prevented from easily moving to the disengaging position (second position). This ensures the engagement between the hook 59 and the engagement hole 35. In this case, for example, a lock mechanism for locking the mechanical key 22 in an accommodated state and an operation means for unlocking the lock of the lock mechanism and removing the mechanical key 22 do not additionally need to be arranged within the case 21. This downsizes the case 21 and consequently downsizes the portable device 12.

(11) The coil spring 58 is fixed to the second cover 57 by simply fitting the winding portion 71 of the coil spring 58 to the protrusion 65 of the cover 57. This facilitates the setting of the coil spring 58 to the second cover 57 and improves the setting efficiency.

(12) The winding portion 71 of the coil spring 58 is fitted to the protrusion 65 of the second cover 57 using the jig 81. The jig 81 includes the support member 83 through which the seat portion 58b of the coil spring 58 is to be inserted. The support member 83 for supporting the winding portion 71 has the positioning recess 84 formed on its distal end surface. The protrusion 65 is fitted to the positioning recess 84.

When the seat portion 58b of the coil spring 58 is arranged around the support member 83 of the jig 81, the winding portion 71 is supported by the distal end surface of the support member 83. Then, the protrusion 65 of the second cover 57 is fitted in the positioning recess 84 of the support member 83, and the winding portion 71 is fitted to the protrusion 65. The winding portion 71 is supported on the distal end surface of the support member 83. Thus, the winding portion 71 does not move in the insertion direction of the protrusion 65 even when the winding portion 71 is forced by the protrusion 65 to insert the protrusion 65 into the positioning recess 84. This enables the second cover 57 and the coil spring 58 to be smoothly fixed to each other.

(13) The jig 81 includes the accommodation recesses 82, each of which can accommodate the coil spring 58. The support member 83 is formed on the inner bottom surface of each accommodation recess 82. Thus, when the protrusion 65 of each second cover 57 is sequentially inserted in the positioning recesses 84 of the support member 83, the winding portion 71 of the coil spring 58 is fitted to the protrusion 65. The coil spring 58 is easily fixed to the second cover 57 simply by sequentially forcing the protrusion 65 of each second cover 57 into the positioning recess 84 of the support member 83. When only one accommodation recess 82 is formed, the insertion of the coil spring 58 into the accommodation recess 82 and the insertion of the protrusion 65 into the positioning recess 84 need to be performed alternately. In this case, the operation of fixing the coil spring 58 to the second cover 57 is burdensome. In the first embodiment, the coil spring 58 is set in each of the accommodation recesses 82. This further simplifies the fixing of the coil spring 58 to the second cover 57.

(14) Each accommodation recess 82 is formed in correspondence with the outer diameter of the coil spring 58. Thus, the compression of the coil spring 58 in the axial direction is restricted by the winding portion 71, which is engaged with the distal end surface of the support member 83. Further, the elastic deformation of the coil spring 58 in a sideward direction (direction vertical to the axial direction) is restricted by the engagement of the circumferential surface of the coil spring 58 with the inner surface of the accommodation recess 82. As a result, the coil spring 58 is supported within the accommodation recess 82 in a stable manner. This enables the coil spring 58 and the second cover 57 to be fixed to each other smoothly.

(15) The coil spring 58 is conical and includes the seat portion 58a, with the seat portion 58b having a smaller diameter than the seat portion 58a, and the winding portion 71 formed on the seat portion 58a. The inner diameter Φ1 of the winding portion 71 is set to be smaller than the inner diameter Φ2 of the seat portion 58b. The diameter of the accommodation recess 82 of the jig 81 decreases toward the inside of the jig 81 so that the accommodation recess 82 corresponds to the outer diameter of the coil spring 58. As a result, the coil spring 58 is supported in the accommodation recess 82 in a stable manner. This enables the coil spring 58 and the second cover 57 to be fixed to each other smoothly.

A second embodiment of the present invention will now be described with reference to FIG. 11.

In the second embodiment, the shape of a protrusion 91 formed on a second cover 57 differs from the shape of the protrusion 65 of the first embodiment. The protrusion 91 forms a fitting portion of the present invention.

Figure 11A:
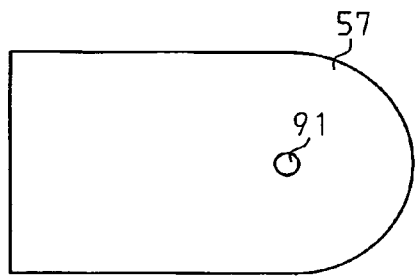
FIG. 11A is a schematic plan view of a second cover according to a second embodiment of the present invention.
Figure 11B:
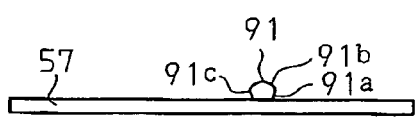
FIG. 11B is a schematic side view of the second cover shown in FIG. 11A.
Figure 11C:
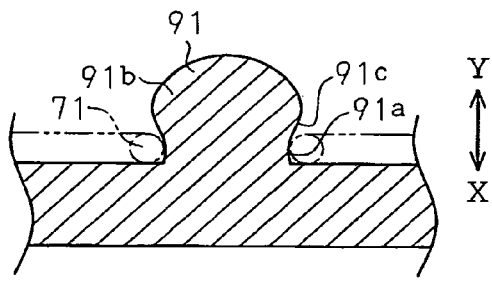
FIG. 11C is an enlarged cross-sectional view of the second cover shown in FIG. 11B.

As shown in FIGS. 11A and 11B, the protrusion 91 is formed integrally with the surface of the second cover 57. As shown in FIG. 11C, the protrusion 91 includes a small diameter portion 91a having a relatively small outer diameter and a large diameter portion 91b having a larger outer diameter than the small diameter portion 91a. The small diameter portion 91a is formed on the basal end of the protrusion 91. The large diameter portion 91b is formed at the distal end of the protrusion 91. A round tapered surface 91c is formed between the small diameter portion 91a and the large diameter portion 91b in a manner that the diameter of the protrusion 91 increases from the basal end toward the distal end. The outer diameter of the small diameter portion 91a is set to be substantially the same as the inner diameter of a winding portion 71 of a coil spring 58. The outer diameter of the large diameter portion 91b is set to be greater than the inner diameter of the winding portion 71. The large diameter portion 91b has a distal end surface, which is a smooth spherical surface.

The same jig 81 as that used in the first embodiment is used to fit the winding portion 71 to the protrusion 91. A support member 83 has a distal end surface with a positioning recess 84. The positioning recess 84 is formed in correspondence with the outer shape of the protrusion 91.

When the protrusion 91 is inserted into the winding portion 71, the winding portion 71 is guided by the spherical distal end surface of the protrusion 91 and elastically deformed so as to increase its diameter. When the winding portion 71 passes by the large diameter portion 91b of the protrusion 91, the winding portion 71 is guided along the tapered surface 91c and the elastic force of the winding portion 71 causes engagement with the small diameter portion 91a. As shown FIG. 1C, the movement of the winding portion 71 in the insertion direction (X direction in the figure) is restricted when the winding portion 71 and the seat portion 58a of the coil spring 58 come into contact with the surface of the second cover 57. Further, as shown in FIG. 11C, when the winding portion 71 is engaged with the small diameter portion 91a of the protrusion 91, the winding portion 71 is engaged with the tapered surface 91c. This restricts the movement of the winding portion 71 in the direction opposite the insertion direction of the winding portion 71 (Y direction in FIG. 1C). As a result, the winding portion 71 is prevented from being separated from the protrusion 91.

Accordingly, the engagement between the winding portion 71 and the basal end of the protrusion 91 is ensured so that the coil spring 58 is supported within the accommodation portion 66 in a stable manner. Further, the insertion resistance of the protrusion 91 into the winding portion 71 of the second embodiment is greater than the insertion resistance of the protrusion 65 into the winding portion 71 in the first embodiment. More specifically, insertion of the protrusion 91 into the winding portion 71 requires a greater force than insertion of the protrusion 65 into the winding portion 71 of the first embodiment. However, the jig 81 is used to insert the protrusion 91 into the winding portion 71 in the second embodiment. More specifically, the winding portion 71 is supported on the support member 83 of the accommodation recess 82. Thus, the movement of the winding portion 71 (particularly the movement in Y direction) is restricted when the protrusion 91 is inserted. This enables the protrusion 91 to be smoothly fitted to the winding portion 71.

A third embodiment of the present invention will now be described.

In the third embodiment, the shape of a protrusion 92 formed on a second cover 57 differs from the shape of the protrusion 65 of the first embodiment. The protrusion 92 forms a fitting portion of the present invention.

Figure 12A:
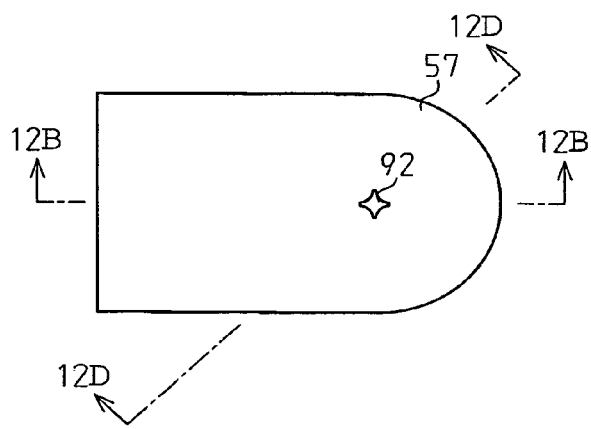
FIG. 12A is a schematic plan view showing a second cover according to a third embodiment of the present invention.
Figure 12C:
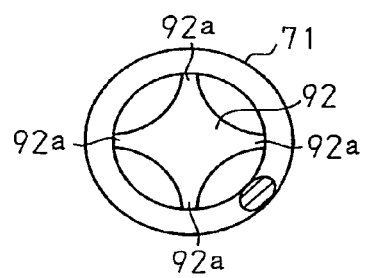
FIG. 12C is an enlarged plan view showing a protrusion of the second cover shown in FIG. 12A.
Figure 12B:
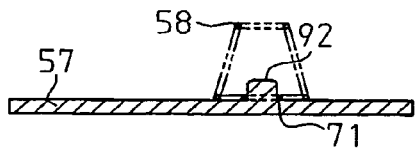
FIG. 12B is a cross-sectional view taken along line 12B-12B in FIG. 12A.
Figure 12D:
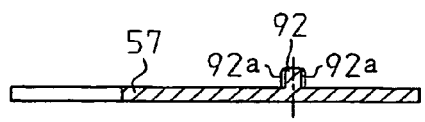
FIG. 12D is a cross-sectional view taken along line 12D-12D in FIG. 12A.

As shown in FIGS. 12A and 12B, the protrusion 92 is formed on the surface of the second cover 57. The protrusion 92 has a star-shaped cross-section. In detail, as shown in FIGS. 12C and 12D, a plurality of ribs 92a, which extend in a direction parallel to the axis of the protrusion 92, are arranged on the circumferential surface of the protrusion 92 at predetermined intervals in the circumferential direction of the protrusion 92. As shown in FIG. 12C, the width of each rib 92a decreases from the center toward the distal end of the rib 92a (outward in FIG. 12C). Each rib 92a has a basal end located between two curved side surfaces so that the basal end of the rib 92a is smoothly continuous to the basal ends of the adjacent ribs 92a. In other words, the protrusion 92 has a smoothly continuous circumferential surface. Further, as shown in FIG. 12D, the distal portion (top portion in FIG. 12D) of each rib 92a in the direction parallel to the axis of the protrusion 92 is curved to facilitate insertion of the protrusion 92 into the winding portion 71.

In the third embodiment, the winding portion 71 of the coil spring 58 is fitted to the protrusion 92 in a manner that the winding portion 71 is engaged with the distal end of each rib 92a as shown in FIG. 12C. In this case, the coil spring 58 is fixed in the accommodation portion 66 in a more stable manner.

In the third embodiment, with the winding portion 71 being engaged with each rib 92a, the insertion resistance of the protrusion 92 in the winding portion 71 is greater than the insertion resistance of the protrusion 65 in the winding portion 71 of the first embodiment. More specifically, the insertion of the protrusion 92 into the winding portion 71 requires a greater pressing force than the insertion of the protrusion 65 into the winding portion 71 of the first embodiment. However, the jig 81 is used to insert the protrusion 92 into the winding portion 71 in the third embodiment. More specifically, the winding portion 71 is supported on the support member 83 of the accommodation recess 82. Thus, movement of the winding portion 71 is restricted during insertion of the protrusion 92. This enables the protrusion 92 to be smoothly fitted to the winding portion 71.

It should be apparent to those skilled in the art that the present invention may be embodied in many other specific forms without departing from the spirit or scope of the invention. Particularly, it should be understood that the present invention may be embodied in the following forms.

The coil spring (resilient member) of the present invention should not be limited to the conical coil spring. For example, the coil spring of the present invention may be a cylindrical coil spring 93 having a substantially uniform coil diameter as shown in FIG. 13. A winding portion 71 is also formed in the coil spring 93.

In the first to third embodiments, the winding portion 71 may be adhered to the inner surface of the second cover 57 to fix the coil spring 58 to the second cover 57. In this case, the protrusion 65 for fixing the winding portion 71 does not have to be formed.

In the first to third embodiments, the structure and method for fixing the coil spring 58 to the second cover 57 may be changed. For example, as shown in FIG. 14A, a plate-like fixing member 94 may be formed on the lower surface of the winding portion 71 of the coil spring 58, and the fixing member 94 may be adhered and fixed to the surface of the second cover 57. In this case, the protrusion 65 is not formed. Further, as shown in FIG. 14B, a through hole 94a for insertion of the protrusion 65 may be formed on the fixing member 94 shown in FIG. 14A. In the structure shown in FIG. 14B, the fixing member 94 is positioned relative to the second cover 57 by inserting the protrusion 65 through the through hole 94a of the fixing member 94. This structure improves the efficiency for adhering and fixing the coil spring 58 (fixing member 94) to the surface of the second cover 57. Further, as shown in FIG. 14C, the fixing member 94 may be directly formed on the end of the coil spring 58 (more specifically, the end of the seat portion 58a). The fixing member 94 shown in each of FIGS. 14A to 14C forms a fixing portion of the present invention.

In the first to third embodiments, the number of windings of the winding portion 71 should not be limited to one (about 360 degrees). The number of windings of the winding portion 71 is preferably three fourths or more of a winding (270 degrees) as shown in FIGS. 15A and 15B. When the winding portion 71 is formed by at least three fourths of a winding, the engagement between the protrusion 65 and the coil spring 58 is sufficiently strong.

The ribs 92a of the third embodiment may be formed on the side surface of the protrusion 91 of the second embodiment. In this case, the winding portion 71 is set on the protrusion 91 not only by fitting the winding portion 71 on the tapered surface 91c of the protrusion 91 but also by engaging the winding portion 71 with the distal end of each rib 92a. In this case, the engagement of the winding portion 71 with the protrusion 91 is stronger. As a result, the coil spring 58 is fixed to the second cover 57 in a more stable manner.

In the third embodiment, the protrusion 65 requires only at least one rib 92a to be formed on the circumferential surface.

In the first to third embodiments, the first cover 56 may be insert molded in a manner that it is attached to the grip 42.

In the first to third embodiments, the first cover 56 does not have to be welded to the second cover 57. Further, the first cover 56 may be adhered to the second cover 57.

Figure 16:
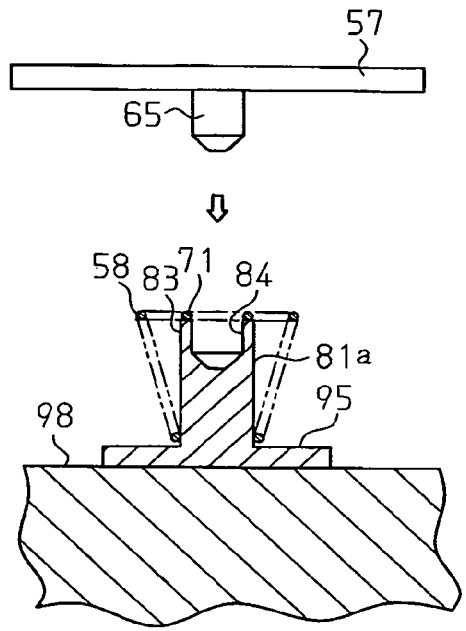
FIG. 16 is a schematic cross-sectional view of a jig used to set a coil spring on a second cover according to another embodiment of the present invention.

In the first to third embodiments, a jig 81a shown in FIG. 16 may be used. The jig 81a is formed by a single support member 83. The support member 83 is placed on a workbench 98. The jig 81a also enables the winding portion 71 to be easily set on the protrusion 65. The same applies to the protrusions 91 and 92 of the second and third embodiments. In this case, a flange 95 is preferably formed on the basal end of the support member 83 to enable the support member 83 to be easily placed on the workbench 98. The support member 83, which is supported on the flange 95, is supported on the workbench 98 in a stable manner. The support member 83 is unlikely to collapse when the second cover 57 is pressed against the support member 83. In this case, the winding portion 71 is easily fit on the protrusion 65. The efficiency of the operation of fixing the coil spring 58 to the second cover 57 is improved. Further, the flange 95 may be formed by, for example, a plurality of divided members that are divided in the circumferential direction. The flange 95 or each divided member forms a support piece of the present invention.

In the first to third embodiments, the spring accommodation recesses 82 of the jig 81 may be in any arrangement. For example, the spring accommodation recesses 82 may be in a zigzag arrangement. Further, there may be only one accommodation recess 82.

Figure 17:
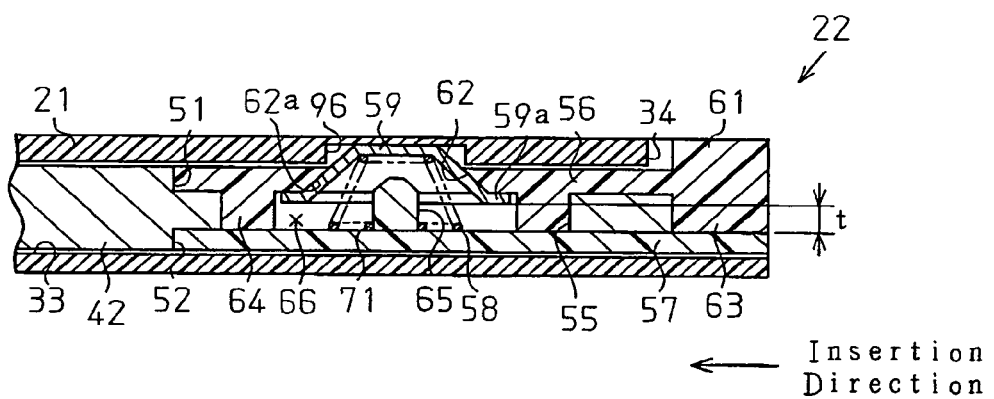
FIG. 17 is a schematic cross-sectional view of a portable device according to another embodiment of the present invention.

In the first to third embodiments, the shape of the engagement hole 35 of the accommodation portion 33 may be changed. For example, as shown in FIG. 17, an engagement recess 96 may be formed in the inner surface of the accommodation portion 33, and the hook 59 of the mechanical key 22 may be engaged with the engagement recess 96. This eliminates the need for forming a hole in the case 21, and prevents a foreign matter, such as dust, from entering the accommodation portion 33. The engagement recession 96 forms an engaged portion of the present invention.

The present examples and embodiments are to be considered as illustrative and not restrictive, and the invention is not to be limited to the details given herein, but may be modified within the scope and equivalence of the appended claims.

What is claimed is:

1. A portable device for electronically locking and unlocking a lock through wireless communication, the portable device comprising:
   a mechanical key for mechanically locking and unlocking the lock, the mechanical key including an opening, a cover defining an internal space in communication with the opening, and a fitting portion formed on the cover;
   an engagement member arranged in the internal space of the mechanical key, the engagement member being movable between a first position at which part of the engagement member projects from the opening and a second position at which the engagement member is substantially accommodated in the mechanical key;
a coil spring that serves as a resilient member, the coil spring being arranged in the internal space of the mechanical key for urging the engagement member toward the first position from the second position; and
a case including a key accommodation portion for removably accommodating the mechanical key so that the mechanical key is capable of being separated from the key accommodation portion, the key accommodation portion including an engaged portion engaged with the engagement member that projects from the opening at the first position when the mechanical key is accommodated in the key accommodation portion;
wherein the coil spring includes:
a first winding portion; and
a second winding portion, formed with the first winding portion, which serves as a fixing portion fixed to the fitting portion of the mechanical key, wherein
the second winding portion and the first winding portion are coplanar; and
the first winding portion and the second winding portion are both supported by an inner surface of the cover on which the fitting portion is formed, the cover being moveable together with the mechanical key when the mechanical key is removed from the case.

2. The portable device according to claim 1, wherein the second winding portion has an inner diameter that is smaller than an inner diameter of the first winding portion.

3. The portable device according to claim 1, wherein the second winding portion and the first winding portion are substantially coaxial.

4. The portable device according to claim 1, wherein the coil spring comprises a conical coil spring, and the conical coil spring includes:
a first end portion including the first and second winding portions; and
a second end portion opposite the first end portion and including a third winding portion integrally formed with the first and second winding portions, with the third winding portion having an inner diameter that is smaller than that of the first winding portion.

5. The portable device according to claim 4, wherein the second winding portion has an inner diameter that is smaller than that of the third winding portion.

6. The portable device according to claim 1, wherein the fitting portion includes a protrusion fitted to the second winding portion.

7. The portable device according to claim 6, wherein the protrusion includes a basal end and a distal end having different outer diameters, with the outer diameter of the basal end being substantially the same as the inner diameter of the second winding portion, and the outer diameter of the distal end being greater than the inner diameter of the second winding portion.

8. The portable device according to claim 6, wherein:
the second winding portion has an axis; and
the protrusion includes at least one rib extending in a direction substantially parallel to the axis of the second winding portion, and the at least one rib includes a basal end portion and a distal end portion that is narrower than the basal end portion.

9. A mechanical key for arrangement in a case of a portable device for electronically locking and unlocking a lock through wireless communication in which the mechanical key is for mechanically locking and unlocking the lock, wherein the case includes a key accommodation portion for removably accommodating the mechanical key so that the mechanical key is capable of being separated from the key accommodation portion, the mechanical key comprising:
a main body including an opening, a cover defining an internal space in communication with the opening, and a fitting portion formed on the cover;
an engagement member arranged in the internal space of the mechanical key, the engagement member being movable between a first position at which part of the engagement member projects from the opening and a second position at which the engagement member is substantially accommodated in the main body; and
a coil spring that serves as a resilient member, the coil spring being arranged in the internal space of the mechanical key for urging the engagement member toward the first position from the second position;
the key accommodation portion including an engaged portion engageable with the engagement member that projects from the opening at the first position when the mechanical key is accommodated in the key accommodation portion; and
wherein the coil spring includes:
a first winding portion; and
a second winding portion, formed with the first winding portion, which serves as a fixing portion fixed to the fitting portion of the main body, wherein
the second winding portion and the first winding portion are coplanar; and
the first winding portion and the second winding portion are both supported by an inner surface of the cover on which the fitting portion is formed, the cover being moveable together with the mechanical key when the mechanical key is removed from the case.

10. A method for assembling a mechanical key for arrangement in a case of a portable device for electronically locking and unlocking a lock through wireless communication in which the mechanical ey is for mechanically locking and unlocking the lock, wherein the case includes a key accommodation portion for removably accommodating the mechanical key so that the mechanical key is capable of being separated from the key accommodation portion, the method comprising:
arranging an engagement member, which is engageable with an engaged portion formed in the key accommodation portion, in an internal space formed in a main body of the mechanical key, in which the internal space is in communication with an opening formed in the mechanical key, and the engagement member is movable between a first position at which part of the engagement member projects from the opening and engages with the engaged portion and a second position at which the engagement member is substantially accommodated in the mechanical key;
fixing a fixing portion arranged on a coil spring, which urges the engagement member from the second position toward the first position, to a fitting portion formed on a cover defining the internal space, wherein the coil spring includes a first winding portion and a second winding portion formed with the first winding portion and functioning as the fixing portion, the second winding portion and the first winding portion are coplanar, and the first winding portion and the second winding portion are both supported by an inner surface of the cover on which the fitting portion is formed, the cover being moveable together with the mechanical key when the mechanical key is removed from the case; and attaching the cover, to which the coil spring is fixed, to the main body of the mechanical key with the coil spring held between the cover and the engagement member.

11. The method according to claim 10, wherein:

the second winding portion has an inner diameter that is smaller than an inner diameter of the first winding portion;

the inner surface of the cover includes a protrusion fitted to the second winding portion; and said step of fixing the fixing portion includes fixing the coil spring to the inner surface of the cover by fitting the second winding portion to the protrusion.

* * * * *